United States Patent [19] 3,676,423
Elizer [45] July 11, 1972

[54] AMPHOTERIC CELLULOSE AND PROCESS FOR THE PREPARATION THEREOF

[72] Inventor: Lee H. Elizer, Keokuk, Iowa

[73] Assignee: The Hubinger Company, Keokuk, Iowa

[22] Filed: Sept. 29, 1969

[21] Appl. No.: 862,051

[52] U.S. Cl. .............................. 260/212, 8/168, 260/2.1 M, 260/15, 260/17 R, 260/211 R, 260/214, 260/215, 260/226, 260/231 A, 260/DIG. 6
[51] Int. Cl. ................................................ C08b 11/00
[58] Field of Search ................ 260/231 R, 212, 231 A, 226, 260/215, 211 R, 214, 2.1 M

[56] References Cited

UNITED STATES PATENTS

| | | | |
|---|---|---|---|
| 2,768,162 | 10/1956 | Evans | 260/231 |
| 3,051,698 | 8/1962 | Elizer et al. | 260/212 |
| 3,102,113 | 8/1963 | Raper et al. | 260/231 |
| 3,514,442 | 5/1970 | Fulkerson et al. | 260/214 |

*Primary Examiner*—Donald E. Czaja
*Assistant Examiner*—Ronald W. Griffin
*Attorney*—Johnston, Root, O'Keeffe, Keil, Thompson & Shurtleff

[57] ABSTRACT

Amphoteric cellulose which contains both cationic and anionic groups linked to the cellulose molecule, and which has an isoelectric point, is prepared. The products can be made to have an affinity for anionic or cationic substances, e.g., acid or basic dyes or resins, by lowering or raising their pH.

17 Claims, No Drawings

AMPHOTERIC CELLULOSE AND PROCESS FOR THE PREPARATION THEREOF

BACKGROUND OF THE INVENTION

Cellulose, for example, cotton cloth, is normally anionic and substantive to basic dyes. It can be converted to a cationic form, for example, by the introduction of cyanamide groups as described in U.S. Pat. No. 3,051,698. The cationic nitrogenated cellulose thus obtained has a direct affinity for acid dyes but no longer has a direct affinity for basic dyes.

It would be desirable to have a cellulosic material which at a certain pH, known as the isoelectric point, is non-ionic, but can be converted to a cationic or anionic state by lowering or raising the pH. Such a material which has both basic and acidic properties, depending upon the pH conditions, can be called amphoteric.

OBJECTS

One of the objects of the invention is to provide new and improved cellulose derivatives which are amphoteric.

Another object is to provide a process for modifying cellulose so as to produce a versatile material which is normally non-ionic but can be further modified by a simple treatment to render it cationic or anionic.

A further object is to produce cellulose having an isoelectric pH which by pH adjustment can be made to have an affinity for either acid or basic dyes or various types of anionic or cationic resins. Other objects will appear hereinafter.

In accordance with the invention, cellulose is prepared in a form in which it contains both cationic and anionic groups.

These new and improved cellulose products are prepared by reacting cellulose with a nitrogen-containing etherifying agent to introduce a cationic group into the molecule, for example, one containing a quaternary or tertiary amino group and/or a cyanamide radical, and also with a reagent capable of introducing an anionic group into the cellulose molecule, for example, one containing a sulfonic or carboxylic radical.

Preferred nitrogen-containing etherifying agents are 2-chloroethyldiethylamine hydrochloride, also called 2-chlorotriethylamine hydrochloride, and 4-chloro-2-butenyltrimethyl ammonium chloride having Formulas I and II, respectively, as follows:

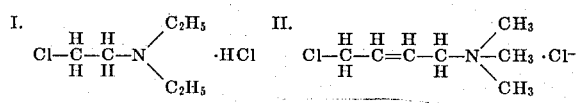

Preferred reagents for introducing anionic groups into the molecule are propane sultone and sodium chloroacetate having formulas III and IV, respectively, as follows:

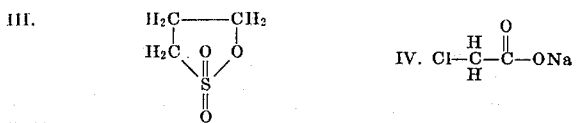

The reaction with the cellulose can be carried out either sequentially or simultaneously. Thus, the 2-chloroethyldiethylamine hydrochloride or 4-chloro-2-butenyltrimethyl ammonium chloride can be reacted with the cellulose first, followed by the addition of the propane sultone or sodium chloroacetate, or the propane sultone or sodium chloroacetate can be reacted with the cellulose, followed by the addition of the 2-chlorotriethylamine hydrochloride, or 4-chloro-2-butenyltrimethyl ammonium chloride, or the 2-chloroethyldiethylamine hydrochloride and/or 4-chloro-2-butenyltrimethyl ammonium chloride and the propane sultone and/or sodium chloroacetate can be mixed together in a suitable solvent to form a clear solution before applying the mixture to the cellulose.

The basic amino groups are preferably introduced into the cellulose molecule by using as one of the reactants a tertiary or quaternary amine or amine salt containing a reactive group linked to a hydrocarbon group of the amine. The hydrocarbon group or groups of the amine can be alkyl (e.g., methyl, ethyl, propyl, isopropyl, butyl, isobutyl), aryl (e.g., phenyl, tolyl), aralkyl (e.g., benzyl), or cycloaliphatic (e.g., cyclopentyl), cyclohexyl, or cycloheptyl). The amine can be a monoamine or a polyamine but is preferably a monoamine. It can also be a heterocyclic amine (e.g., piperidine, pyridine). In general, however, from the standpoint of ease of carrying out the reaction of desirable properties in the resultant products, it is preferred to use a water soluble amine. The reactive groups of the amine are preferably either halogen (e.g., chloro-, bromo-, etc.) or epoxy. The portion of the amine to which the reactive group is attached is acyclic. The reactive group is preferably separated from a nitrogen atom of the amine by at least one carbon atom, usually two to six carbon atoms.

The resultant products may be described by the following structural formula:

V. 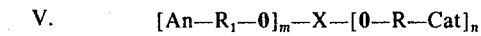

where X is cellulose, An is an anionic group, e.g., carboxylic, carboxylate, sulfonic, sulfonate, phosphate, phosphonate, or other anionic group, Cat is cationic group, e.g., tertiary amino, or quaternary, or other amine or amine salt, R and $R_1$ are divalent acyclic hydrocarbon or hydroxyhydrocarbon groups having 1 to 6 carbon atoms, and m and n represent the number of times these radicals occur, usually a minimum of 0.15 each per 100 anhydroglucose units and a total of $m + n$ not exceeding 12. The ratio of $m:n$ is normally within the range of 1:10 to 10:1.

A preferred group of products is represented by the following general formula:

VI. 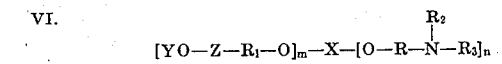

where X is cellulose, R and $R_1$ are divalent acyclic hydrocarbon or hydroxyhydrocarbon groups preferably having one to six carbon atoms and more specifically one to four carbon atoms; $R_2$ and $R_3$ are hydrocarbon, preferably alkyl having one to six carbon atoms and more specifically one to four carbon atoms;

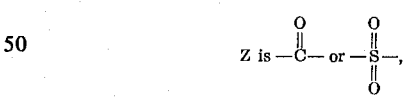

Y is hydrogen or a salt forming radical, e.g., sodium, potassium, calcium, ammonium, and m and n are numerical values representing the number of times the anionic and cationic radicals, respectively, occur in the molecule, usually 0.15 to 3, and a total ordinarily not exceeding 8, per 100 anhydroglucose units.

The term "cellulose" when used herein refers to cellulose in its natural or regenerated form, e.g., fatty acid esters of cellulose, such as cellulose acetate, cellulose propionate, cellulose butyrate and mixed esters, such as cellulose acetate propionate and cellulose acetate butyrate, and with cellulose xanthate. The cellulosic material can be treated in any desired physical form, as, for example, in the form of a fiber, pulp, or granule slurry, woven or non-woven cloth, paper sheets, or plastic films. The cellulose can be derived from any source such as wood, cotton, straw, pith, and the like. Cellulose xanthate can be treated in solution.

Sultones are intramolecular cyclic esters of hydroxysulfonic acids and may be derived both from aliphatic and from aromatic sulfonic acids. Examples of sultones suitable for the present purpose are 1,3-propanesultone, 1,4-butanesultone, mixtures of isomeric butanesultones (which may be prepared from mixtures of chlorobutanesulfonic acids, obtained by sulfochlorination of 1-chlorobutane), benzylsultone and tolylsultone.

Sodium chloroacetate is the sodium salt of monochloroacetic acid. The free acid can be used but since the reaction is carried out under alkaline conditions it will be converted to a salt. Other reactive halogen aliphatic acids and their salts (e.g., Na, K, Ca) containing two to six carbon atoms can be used, for example, monobromoacetic acid and its sodium salt, and monochloropropionic acid and its salts.

Examples of amine etherifying agents suitable for the practice of the invention are: 2-chloroethyldiethylamine; 2-chloroethyldiethylamine hydrochloride; 2-chloroethyldimethylamine; 2-chloroethyldimethylamine hydrochloride; 3-chloropropyldiethylamine; 3-chloropropyldiethylamine hydrochloride; 3-chloropropyldimethylamine; 3-chloropropyldimethylamine hydrochloride; 4-chlorobutyldiethylamine; 4-chlorobutyldiethylamine hydrochloride; 2-chloroisopropyldimethylamine; 2-hydroxy-3-chloropropyltrimethylamine chloride; 3-dibutylamino-1,2-epoxypropane; 2-bromo-5-diethylaminopentane hydrobromide; N-(2,3-epoxypropyl) piperidine, and N,N-(2,3-epoxypropyl)methyl aniline. In general, it is preferable to use the salts of the amine esterifying agents, such as, for example, the hydrochlorides and hydrobromides. Mixtures of amine etherifying agents can be employed. The salts should be selected so as to avoid formation of precipitates. For example, if calcium, strontium or barium is present, sulfates or should not be used because insoluble salts such as calcium sulfate or calcium phosphate would form. However, sulfates or phosphates can be used where sodium, potassium or lithium ions are present.

Cyanamide can be used in an alkaline aqueous solution, preferably of an alkali metal or alkaline earth metal base, such as sodium, potassium, lithium, calcium, barium or strontium hydroxide, or their basic salts, or an aqueous solution of an alkali metal or alkaline earth metal cyanamide, such as sodium, potassium or calcium cyanamide. It is ordinarily not necessary to add a base to a solution of the cyanamide salt since solutions of such salts in water are generally sufficiently alkaline. An aqueous solution of calcium cyanamide, for example, generally has a pH in the range of about 10.5 to 11.9. An alkali metal or alkaline earth metal cyanamide hydrolyzes in water to form a solution which is substantially similar to an aqueous solution of cyanamide in an alkaline solution of an alkali metal or alkaline earth metal base.

The reaction mixture containing the cellulosic material is maintained at the desired reaction temperature for a sufficient length of time to obtain the desired degree of substitution. Reaction occurs at a substantial rate at reduced to ordinary temperatures. This is an advantage where elevated temperatures are either unfeasible or undesirable. For more rapid reaction rates, the reaction temperature can be increased. There is ordinarily no economic advantage in continuing the reaction period beyond the point at which the desired or maximum degree of substitution is achieved.

The anionic substitution is preferably carried out using a water miscible organic solvent for the substance used to introduce the anionic component, e.g., acetone, methylethyl ketone, or dimethylformamide. One reason for dissolving the sultone or other anionic substituent in acetone or other organic solvent is to obtain more even distribution of anionic groups over the cloth, sheet, or other form of cellulose. Without the solvent or diluent there is a likelihood of producing a high concentration of anionic groups with the result that a soluble cellulose is formed which dissolves when the product is washed with water. Where the product is a cloth, or sheet, holes would be formed in the cloth or sheet. The quantity of solvent required can be determined by routine experiment. The solution of anionic substituent in the solvent should wet the cellulose evenly. The solvent must be chemically inert to the reactants and the product.

It will be recognized that the quantity of anionic and cationic substituents should be controlled to produce a cellulose product having an isoelectric point which can be made cationic by lowering the pH and anionic by raising the pH.

In the anionic state the cellulose products are substantive to basic dyes, e.g., methylene blue (CI52015), and also to cationic treating and coating compositions including cationic emulsions of urea-formaldehyde and melamine-formaldehyde, and cationic linear polymers containing imino, amino, and quaternary groups, of the type usually referred to as high molecular weight polyelectrolytes.

The cellulosic products can be separated from the alkaline reaction mixture, washed, dried, and employed as such at their isoelectric points. They can also be acidified to form the cationic acid salts, which, in many cases, are preferred as, for example, where the cellulosic product is to be dyed with an acid dye salt.

The acid salt derivatives can be prepared from the washed and dried products by treating them with an aqueous solution of the desired acid. Ordinarily, they are most conveniently prepared by acidification of the alkaline reaction mixture with the particular acid, the derivative of which is desired. The pH is preferably reduced to 4 or less, in some cases, to as low as 1.

Substantially any acid can be used, including inorganic and organic acids, such as hydrochloric, nitric, sulfuric, sulfurous, phosphoric, acetic, propionic acids, and the like. In general, it is preferred to employ hydrochloric acid.

The acidification treatment can be carried out at reduced, ambient or elevated temperatures, as, for example, the temperature of the initial substitution reaction. After the acid treatment is completed, the cellulose product acid salts can be removed from the reaction mixture, washed, and dried in any convenient manner.

The derivatives in the cationic state possess the dyeing properties of wool and can readily by dyed with acid dyestuffs such as light green SF yellowish (C.I. 670, Merck Index, 6th Edition, page 573), acid fuchsine (C.I. 692, trisodium salt of the trisulfonic acid of parafuchsine), eosin Y (C.I. 768, disodium salt of 2,4,5,7-tetrabromo-9-0-carboxyphenyl-6-hydroxy-3-isoxanthone), orange G (C.I. 27, disodium salt of 1-phenyl-azo-2-naphthol-6,8-disulfonic acid), and the like.

The cellulose derivatives in the cationic state are also substantive to anionic treating and coating compositions, such as anionic emulsions of urea-formaldehyde, melamine-formaldehyde, polystyrene, acrylic resins, vinyl resins, rubber, rosin, and the like. Starch sizing is also improved.

The reagents for introducing anionic and cationic groups both act as etherifying agents for cellulose under basic conditions. The reaction can be carried out at ordinary or slightly elevated temperatures below the temperature at which the cellulose is degraded, for example, within the range of 35° to 225° F. The reaction can be carried out under atmospheric, subatmospheric or superatmospheric pressures. The product is insoluble in water and therefore can be recovered by filtration, washing with water and drying.

The invention will be further illustrated but is not limited by the following examples in which the quantities are stated in parts by weight unless otherwise indicated.

EXAMPLE 1

Dissolve 183 grams (1.5 moles) propane sultone in 174 grams (3 moles) acetone. Apply this solution evenly and uniformly to a strip of bleached, unfinished cotton sheeting weighing 81 grams (0.5 AGU) dry substance cellulose.

Dissolve 258 grams (1.5 moles) 2-chloroethyldiethylamine hydrochloride in 90 cc (5 moles) of water. Apply this solution to the aforesaid cloth.

Dissolve 180 grams (4.5 moles) of NaOH in 180 grams (10 moles) of water. Cool to ambiency (78° F.) Apply this alkaline solution to the previously treated cloth uniformly and allow the cloth to remain submerged completely for 22 hours, at which time the pH is 10.5. It should be noted that the temperature rises to 101° C. when the NaOH is added.

Adjust the pH to 7.0 with 143 cc of 6N HCl. Wash the resultant product well, using tap water, and rinse it in distilled water. Allow it to air dry. This product is labelled 7.1–35. It has an isoelectric pH between 6.0 and 6.5 When the pH is adjusted below 6.0 it is cationic and at a pH above 6.5 it is anionic. The bleached cotton sheeting is anionic at all pH's.

EXAMPLE II

Dissolve 122 grams (1 mole) of propane sultone in 87 grams (1.5 moles) of acetone. Apply this solution to 81 grams of bleached unfinished cotton sheeting as in Example I. Dissolve 172 grams (1 mole) of 2-chloroethyldiethylamine hydrochloride in 45 grams (2.5 moles) of water and apply this solution to the cotton sheeting.

Dissolve 120 grams (3 moles) NaOH in 120 cc of water and apply this solution to the cotton sheeting. The temperature rises to 101° C. Leave the cotton sheeting submerged for 22 hours. The pH is 10.6 and is adjusted to 7 by adding 119 cc 6N HCl. Wash the product well with tap water and finally in distilled water. Allow it to air dry. This product has an isoelectric pH of 6.0–6.5. This product was labeled 7.2–35.

EXAMPLE III

Dissolve 61 grams (0.5 mole) of propane sultone in 87 grams (1.5 moles) of acetone. Apply this solution evenly to 81 grams of bleached unfinished cotton sheeting.

Dissolve 86 grams (0.5 mole) of 2-chloroethyldiethylamine hydrochloride in 23 cc of water. Apply this solution evenly to the cotton sheeting.

Dissolve 60 grams (1.5 moles) of NaOH in 60 cc of water. Cool to ambiency (78° F.) and apply this solution evenly to the cotton sheeting. The temperature rises to 76° C. Add 200 cc of water and keep the cloth submerged in the solution for 21 hours. At the end of this time the pH is 11. Adjust the pH to 7 by adding 80 cc of 6N HCl. Wash the product well with tap water and finally in distilled water. Allow it to air dry. This product has an isoelectric pH of 6.5–7.5. This product was labeled 7.3–35.

EXAMPLE IV

Dissolve 30.5 grams (0.25 mole) of propane sultone in 87 grams (1.5 moles) of acetone. Apply this solution evenly to 81 grams (0.5 AGU) of bleached unfinished cotton sheeting.

Dissolve 43 grams (0.25 mole) of 2-chloroethyldiethylamine hydrochloride in 12 cc of water and apply this solution to said cotton sheeting evenly.

Dissolve 30 grams (0.75 mole) of NaOH in 30 cc of water, cool to 78° F. and apply this solution of the cotton sheeting evenly. Add 500 cc of water and keep the cotton sheeting submerged for 21 hours. The temperature rises to 36° C. The pH is 11.3.

At the end of 21 hours, adjust the pH to 7 by adding 25 cc of 6N HCL. Wash the cellulose product well with tap water and finally with distilled water. This product has an isoelectric pH of 6.5–7.5. It is labeled 7.4–35.

EXAMPLE V

Dissolve 6.1 grams (0.05 mole) of propane sultone in 87 grams of acetone and apply the solution to 81 grams of bleached unfinished cotton sheeting.

Dissolve 8.6 grams (0.05 mole) of 2-chloroethyldiethylamine hydrochloride in 12 cc of water and apply this solution to said cotton sheeting evenly.

Dissolve 6 grams (0.15 mole) of NaOH in 12 cc of water, cool and wet the cotton sheeting evenly with this solution. Add 500 cc of water, keep submerged for 18 hours at the ambient temperature (78° F.). After 18 hours the pH drops from 11.6 to 9.2. Add 13 cc of 6N HCl to adjust the pH to 7.0. Wash the product well with tap water, then with distilled water and air dry it. This product has an isoelectric pH of 6.0–7.5. It is labeled 7.5–35.

The products in Examples I to V were analyzed and compared with a blank of the bleached unfinished cotton sheeting with the results shown in the following table.

TABLE

| | Blank | 7.1–35 | 7.2–35 | 7.3–35 | 7.4–35 | 7.5–35 |
|---|---|---|---|---|---|---|
| Oven Dry Solids (percent) | 95.16 | 90.90 | 92.04 | 93.94 | 92.58 | 94.32 |
| Ash % Dry basis | 0.49 | 0.64 | 0.66 | 0.35 | 0.19 | 0.09 |
| Nitrogen % Dry basis | 0.04 | 0.59 | 0.67 | 0.67 | 0.57 | 0.16 |
| Sulfur % Dry basis | 0.006 | 0.91 | 1.02 | 0.64 | 0.64 | 0.10 |
| Isoelectric pH | – | 6.0–6.5 | 6.0–6.5 | 6.5–7.5 | 6.5–7.5 | 6.0–7.5 |

It will be seen that all of these products when compared to the blank showed an appreciable increase in nitrogen and sulfur contents. All of them had an isoelectric pH, whereas the blank had no isoelectric pH. All of them could be rendered either cationic or anionic by lowering or raising the pH from the isoelectric pH.

The following method is used in obtaining the isoelectric pH:

Suspend a strip of cloth about one inch wide and 10 inches long in 500 cc distilled water. Adjust the pH to 4.0 with 0.1N HCl. When the pH becomes constant at 4.0 (this may take 10 minutes) remove cloth, squeeze and place in about 10 cc of 0.0001 molar light green SF yellowish, C.I. No. 42095. If the cloth takes all the dye out of the solution, which 7.1–35, 7.2–35, 7.3–35, 7.4–35, and 7.5–35 did, another strip of cloth is immersed in 500.0 cc water at pH 4.5 and the dyeing repeated, and so on in steps of 0.5 pH unit until the cloth does not accept the acid dye. 7.1–35 did not accept the acid dye, light green SF yellowish at pH 6.0, although it did accept it at pH 5.5, therefore, 7.1–35 is cationic below pH about 6.0. Another strip was immersed in about 500 cc distilled water and the pH adjusted to 9.0 with 0.1N KOH. When the pH became constant after about 10 minutes, the strip of cloth was squeezed and immersed in 0.0001 molar solution of the basic dye methylene blue, C.I. No. 52015; after about 3 minutes there was no dye in 7.1–35, 7.2–35, 7.3–35, 7.4–35 and 7.5–35 solutions, so the process was repeated at pH 8.5, then 8.0, etc. until the dye remained in the solution. Therefore, above pH 6.5, the cloth labeled 7.1–35 is anionic. The isoelectric pH is between 6.0 and 6.5; below pH 6.0 the cloth is cationic and above pH 6.5, it is anionic. The bleached sheeting used in these experiments was anionic at all pH's.

In a similar manner to the examples, a series of cellulose products containing carboxy and carboxylate substituents instead of sulfonic and sulfonate substituents can be prepared by substituting chemically equivalent amounts of sodium chloroacetate for the sulfone. Other cationic substituents can be added to the cellulose molecule by substituting other amines as previously given, or cyanamide, for the 2-chloroethyldiethylamine, in chemically equivalent amounts. Specifically preferred are 4-chloro-2-butenyltrimethyl ammonium chloride and 2-hydroxy-3-chloropropyltrimethylamine chloride.

The cationic groups which are introduced into the cellulose molecule are preferably tertiary amino groups or quaternary amino groups but can be of any other type. The introduction of the anionic groups into the cellulose molecule can take place with the elimination of a hydrogen halide. For example, where sodium chloroacetate is employed the reaction occurs with the elimination of hydrogen chloride. In the case of propane sultone the reaction takes place with the opening of the sultone ring.

The isoelectric cellulose has enhanced oil resistance and enhanced resistance to ink penetration. It is therefore especially useful for paper, cloth, and other non-woven and woven sheet materials. The products of the invention are also useful as ion exchange materials and in making ionic membranes and dialysis membranes. In the textile field, the invention is very useful in increasing the affinity of cellulose, or mixtures of cellulose and polyester fibers (e.g., 65 percent polyester fiber and 35 percent cotton fibers), for specific types of dyes.

The invention is hereby claimed as follows:

1. Cellulose having the formula

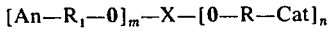

$$[An-R_1-O]_m-X-[O-R-Cat]_n$$

wherein X is cellulose, An is an anionic group, Cat is a cationic group, R and $R_1$ are divalent acylic hydrocarbon or hydroxyhydrocarbon groups having one to six carbon atoms, m and n are each at least 0.15 per 100 anhydroglucose units, the total of $m + n$ does not exceed 12 per 100 anhydroglucose units, and the ratio of $m:n$ is within the range of 1:10 to 10:1.

2. A cellulose as claimed in claim 1 in which An is carboxylic or carboxylate.

3. A cellulose as claimed in claim 1 in which An is sulfonic or sulfonate.

4. A cellulose as claimed in claim 1 in which Cat is quaternary ammonium.

5. A cellulose as claimed in claim 1 in which Cat is tertiary amino.

6. A cellulose as claimed in claim 1 in which Cat is cyanamide.

7. Cellulose having the formula

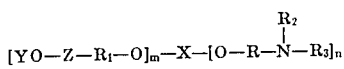

$$[YO-Z-R_1-O]_m-X-[O-R-\underset{R_3}{\overset{R_2}{N}}]_n$$

where X is cellulose, R and $R_1$ are divalent acyclic hydrocarbon or hydroxyhydrocarbon groups having one to six carbon atoms, $R_2$ and $R_3$ are hydrocarbon having one to six carbon atoms,

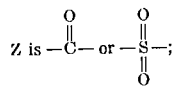

$$Z \text{ is} -\overset{O}{\underset{}{\overset{\|}{C}}}- \text{ or } -\overset{O}{\underset{O}{\overset{\|}{S}}}-;$$

Y is hydrogen or a salt forming radical, m and n are numerical values having a minimum value of 0.15 per 100 anhydroglucose units, the total of $m + n$ not exceeding 12 per 100 anhydroglucose units and the ratio of $m:n$ being within the range of 1:10 to 10:1.

8. A cellulose as claimed in claim 1 in which the pH is its isoelectric pH.

9. A cellulose as claimed in claim 1 which has its pH lowered below the isoelectric pH.

10. A cellulose as claimed in claim 1 which has its pH raised above the isoelectric pH.

11. A process for preparing an amphoteric cellulose which comprises reacting cellulose in an alkaline medium with a cationic nitrogen containing etherifying agent and a reagent containing anionic groups capable of reacting with the cellulose to form an ether of the cellulose in which an oxygen atom of the cellulose is connected through a hydrocarbon group to an anionic group, said reagent being dissolved in a water miscible organic solvent which is chemically inert to the reactants and product and is present in sufficient amount to distribute and reagent uniformly in contact with the cellulose, the quantities of said nitrogen containing etherifying agent and said reagent containing anionic groups being sufficient to produce an amphoteric cellulose but insufficient to render the cellulose water soluble.

12. A process as claimed in claim 11 in which said reagent is a monohalogeno carboxylic acid containing 1 to 6 carbon atoms.

13. A process as claimed in claim 11 in which said reagent is a sultone.

14. A process as claimed in claim 11 in which said reagent is sodium chloroacetate.

15. A process as claimed in claim 11 in which said reagent is propane sultone.

16. A process as claimed in claim 11 in which the ratio of anionic groups to cationic groups in the amphoteric cellulose is within the range of 1:10 to 10:1.

17. A process as claimed in claim 11 in which the proportions of reactants are sufficient to introduce a minimum of 0.15 anionic group, 0.15 cationic group and a total not exceeding 12 anionic and cationic groups per 100 anhydroglucose units in the cellulose.

* * * * *

PO-1050
(5/69)

UNITED STATES PATENT OFFICE
CERTIFICATE OF CORRECTION

Patent No. 3,676,423            Dated July 11, 1972

Inventor(s) Lee H. Elizer

It is certified that error appears in the above-identified patent and that said Letters Patent are hereby corrected as shown below:

Column 8, line 20, claim 11, "to distribute and" should read -- to distribute said --.

Signed and sealed this 12th day of December 1972.

(SEAL)
Attest:

EDWARD M. FLETCHER, JR.                      ROBERT GOTTSCHALK
Attesting Officer                                  Commissioner of Patents